(12) United States Patent
Jakatdar et al.

(10) Patent No.: US 6,768,983 B1
(45) Date of Patent: Jul. 27, 2004

(54) SYSTEM AND METHOD FOR REAL-TIME LIBRARY GENERATION OF GRATING PROFILES

(75) Inventors: Nickhil Jakatdar, Los Altos, CA (US); Michael Laughery, Austin, TX (US)

(73) Assignee: Timbre Technologies, Inc., Santa Clara, CA (US)

( * ) Notice: Subject to any disclaimer, the term of this patent is extended or adjusted under 35 U.S.C. 154(b) by 473 days.

(21) Appl. No.: 09/727,530

(22) Filed: Nov. 28, 2000

(51) Int. Cl.[7] .............................................. G06N 5/02
(52) U.S. Cl. ............................................ 706/46; 706/20
(58) Field of Search .................... 356/601, 625, 356/635, 636, 640, 369, 326, 300, 446; 702/172, 81, 83, 170, 97, 155, 167; 703/2; 706/46, 12, 20, 934

(56) References Cited

U.S. PATENT DOCUMENTS

| | | | | |
|---|---|---|---|---|
| 5,867,276 A | * | 2/1999 | McNeil et al. | 356/445 |
| 5,963,329 A | * | 10/1999 | Conrad et al. | 356/613 |
| 6,483,580 B1 | * | 11/2002 | Xu et al. | 356/300 |
| 6,556,947 B1 | * | 4/2003 | Scheiner et al. | 702/172 |
| 6,590,656 B2 | * | 7/2003 | Xu et al. | 356/369 |
| 6,636,843 B2 | * | 10/2003 | Doddi et al. | 706/46 |

OTHER PUBLICATIONS

Xinhui Niu, "An Integrated System of Optical Metrology for Deep Sub–Micron Lithography", Electronics Research Lab., College of Engineering UC Berkeley, Apr. 1999, 139 pgs.
William H. Press et al., "Numerical Recipes in C", The Art of Scientific Computing, Sec. Ed., pp. 444–455, Cambridge University Press, 1986.

\* cited by examiner

*Primary Examiner*—Hoa Q. Pham
(74) *Attorney, Agent, or Firm*—Morrison & Foerster LLP

(57) ABSTRACT

The present invention provides a method and a system for a real-time configurable definition and generation of grating profile libraries. A parameter set is used to specify the ranges of grating dimensions and resolutions of the profile library to be generated. In one embodiment, a compiler creates subsets of a large profile library, the subset designed to enable rapid search and validation of real-time data. In another embodiment, an automatic process generates a new parameter set and a new subset of the library when trigger conditions are met. Subsets of the profile library may be used to check if grating spectrum data are within the ranges established for an application and if the dimensions are within the process averages established for a manufacturing run. The system for generation of grating profile libraries is scalable, operable in a distributed environment, and includes application specific items that can be selected or determined by the client.

41 Claims, 11 Drawing Sheets

| Grating Top CD | Grating Bottom CD | Grating Thickness | Percent Height at Inflection Point | Grating Width at Inflection Point | Underlying Thickness | Calculated Spectrum Data |
|---|---|---|---|---|---|---|
| | | | | | | |

*FIGURE 11A - DATABASE ELEMENTS OF A GRATING PROFILE LIBRARY*

Grating Top CD    Grating Bottom CD    Grating Thickness    Percent Height at Inflection Point    Grating Width at Inflection Point    Underlying Thickness    Calculated Spectrum Data

*FIGURE 11B - DISPLAY ELEMENTS OF A GRATING PROFILE LIBRARY*

SYSTEM AND METHOD FOR REAL-TIME LIBRARY GENERATION OF GRATING PROFILES

BACKGROUND OF INVENTION

1. Field of Invention

Invention relates to the measurement of dimensions in gratings and more particularly to the generation and use of configurable libraries of grating profiles.

2. Description of Related Art

Features on semiconductor devices and transmitters of optical fiber links are being formed that are less than one micron in width. Measurement of these sub-micron features is increasingly difficult as the size of the features become smaller. However, knowledge of the dimensions of gratings or periodic structures is essential in order to determine if the dimensions of the features are within the acceptable ranges and if a particular fabrication process causes the sidewalls of the features to be tapered, vertical, T-topped or undercut.

Traditionally, a sample was cleaved and examined with a scanning electron microscope or similar device. This method is slow, expensive, and only provides one measurement number seen from the top of the feature. Angular scatterometry have been employed to measure linewidths of gratings but the process requires a setup of multiple detectors at different angles from the incident beam to measure the diffraction of the scattered light. Again, this is difficult to implement because of the setup required.

Spectroscopic reflectometry and ellipsometry are used to beam light on the grating and measure the spectra of reflected signals. Current practices basically use an empirical approach where the spectra of reflected light is measured for a known width of features in a grating. This process is time consuming and expensive even for a limited library of profiles of grating dimensions and the associated spectrum data of reflected light. There is a need for a less laborious and less expensive method of creating the library of profiles and associated spectrum data.

Furthermore, if such a library were built for a wide range of profiles, it would be very useful to have access and use of the library in a real-time environment. An extensive library of profiles and spectrum data would however be inefficient for searching purposes needed for real-time work. For a short fabrication run, a client may only need a small subset of the extensive master library. Thus, there is a need for a method and system of providing libraries of grating profiles that are responsive to both long term and short term requirements of the client.

SUMMARY OF INVENTION

Invention resides in a method and a system for creating configurable libraries of grating profiles and spectrum data. The method comprises specifying a parameter set of a plurality of dimensions of a grating and compiling a master library of grating profiles corresponding to the combinations of the parameter set of the plurality of dimensions at different resolutions and the calculated spectrum data.

One embodiment is a system for creating a run-time library of profiles comprising a master library of profiles and the calculated spectrum data; a storage medium for storing the run-time library; a computer coupled to the master library and the storage medium; and a run-time compiler operable in the computer, for generating the run-time library; wherein the computer activates the run-time compiler to prompt for identification of the selection parameter set, to validate the selection parameter set, to extract the profiles from the master library, and to create a run-time library.

Furthermore, the present invention includes a method for evaluating grating spectrum data, the method comprising comparing a grating spectrum data to the ranges of grating calculated spectrum data in a run-time library; flagging the grating spectrum data as falling within the profile calculated spectrum data ranges in the run-time library or flagging the grating spectrum data falling outside the profile calculated spectrum data ranges in the run-time library; selecting the profile instance in the run-time library whose calculated spectrum data is closest to the grating spectrum data; and recording the selected profile instance.

Another embodiment of the present invention is a system that invokes a compiler when a set of conditions is met. The system comprises a master library; a starting run-time library compiled with a starting set of trigger conditions; a replacement run-time library, for replacing the starting run-time library; a run-time compiler; a computer; and a comparator operable in the computer, for comparing the calculated set of process trigger values to the starting set of trigger conditions; wherein the comparator, detecting a condition where the calculated process trigger values meet the requirements of the starting set of trigger conditions, automatically invokes the run-time compiler to compile the replacement run-time library.

The present invention also includes a method of providing a service for generating a library of grating profiles, the method comprising contracting by a client and a vendor, where in return for remuneration from the client, the vendor provides access to the systems, processes, and procedures to generate the library or generates and delivers the library.

BRIEF DESCRIPTION OF DRAWINGS

FIG. 11A shows the database elements of a grating profile library in one embodiment of the present invention while FIG. 11B shows the display elements of a grating profile library in one embodiment of the present invention.

DETAILED DESCRIPTION OF PREFERRED EMBODIMENT(S)

Figure 1:
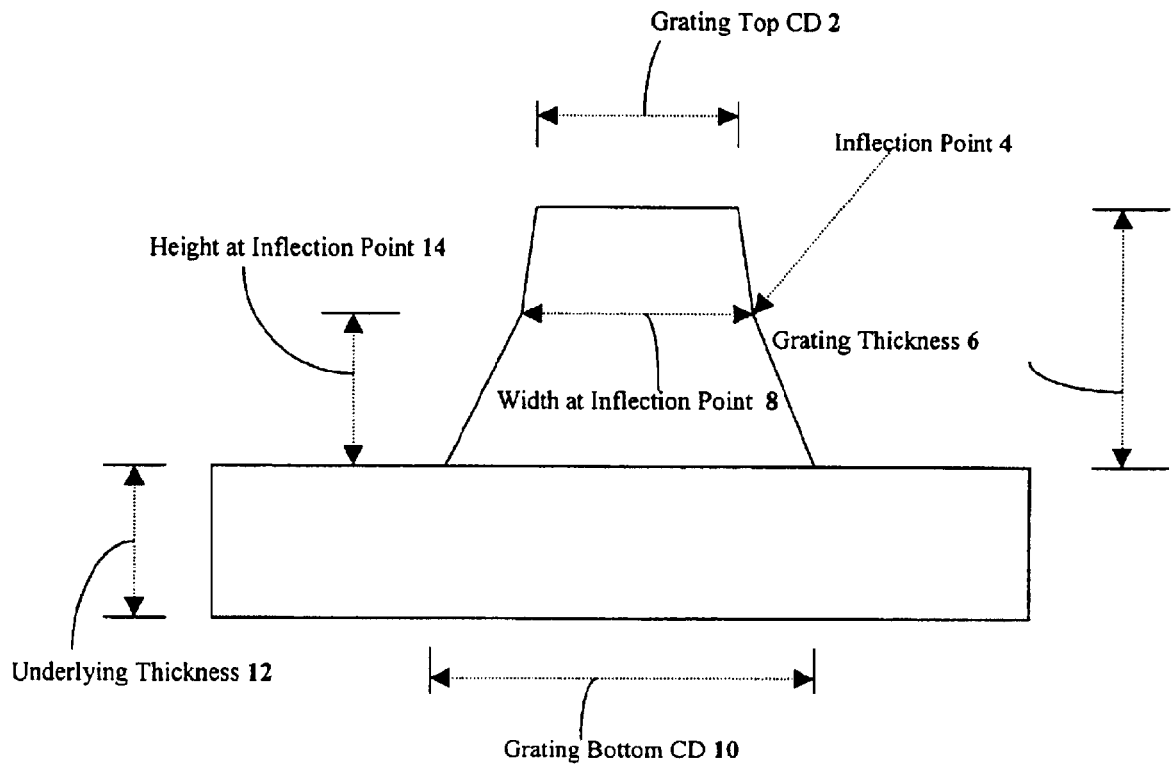
FIG. 1 is an architectural diagram illustrating the dimensions of a grating feature in one embodiment of the present invention.

FIG. 1 is an architectural diagram illustrating the critical dimensions (CD) of a grating feature in one embodiment of the present invention. The cross-sectional view of a feature in a grating has a grating top CD 2, grating bottom CD 10, a grating thickness 6, and underlying thickness 12. Other dimensions are the width at inflection point 8 and the height at the inflection point 14. The inflection point 4 is the point in the sidewall of the feature where the slope changes. The percent height at inflection point is defined as the ratio of the height at inflection 14 to the grating thickness 6. Some applications may include other feature measurements such as the magnitude of T-topping, footing, rounding, undercut, concave sidewalls, and convex sidewalls as well as the angle of intersection of the sidewall and the underlying thickness.

Figure 2A:
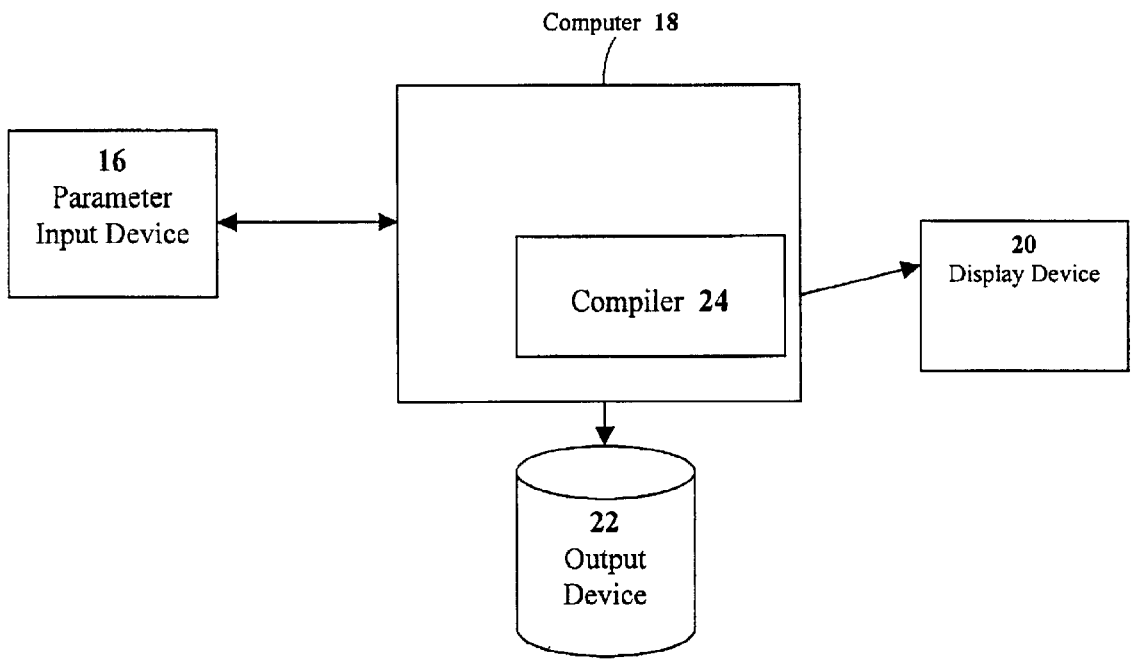
FIG. 2A is an architectural diagram illustrating the compilation of a master library of grating profiles in one embodiment of the present invention.

FIG. 2A is an architectural diagram illustrating the compilation of a master library of grating profiles in one embodiment of the present invention. Parameter input device 16 is used to enter a parameter set including the minimum value, maximum value, and the resolution of the dimension of a grating. In alternative embodiments, a parameter set may be created by other input means and specified as the parameter set for a compilation run.

Resolution is the increment by which the parameter dimension changes for the next higher or next lower value. For example, a grating top CD may have a minimum value of 120 nanometers, a maximum value of 180 nanometers, and a resolution of 1 nanometer. Resolution steps is the number of instances of a grating dimension for a given resolution and is calculated using the following formula:

Resolution Steps $(D)$=((Maximum Value−Minimum Value)/Resolution)+1 where $D$ refers to a dimension of a grating.

In the example above, the resolution steps of the grating top CD would be 61. The number of resolution steps is used to calculate the size of a library.

The compiler 24, operable in the computer 18, uses the specified parameter set to compile a master library and stores it in the output device 22. Optionally, a master library display 20 may be produced. The computer 24 may be one computer or a server farm with a plurality of servers. The computer 24 may be co-located with the parameter input device 16 or may reside at a distributed remote site. The output device 22 may be a CD-ROM drive, a DVD drive, a disk drive, a tape drive, or a remote storage unit.

The master library comprises a matrix where the rows are profiles including an instance of a parameter dimension at varying resolutions in combination with the other parameters at varying resolutions and the corresponding calculated spectrum data. Spectrum data refers to the data representing the digitized measurements of the reflected light from a grating. Calculated spectrum data is derived by solving a rigorous mathematical model of the reflected light from a grating with a given set of parameter dimensions. One such mathematical model is described in "An Integrated System of Optical Metrology for Deep Sub-Micron Lithography", University of California at Berkeley Doctoral Thesis of Xinhui Niu, Apr. 20, 1999, which is incorporated here by reference.

Actual spectrum data may be obtained by using a spectroscopic optical metrology device. Examples of spectroscopic optical metrology devices include spectroscopic ellipsometers and spectroscopic reflectometers.

The size of a compiled master library is a consideration during compilation and during real-time use of the library. For example, the parameter set illustrated in Table 1 would generate a total master library size of 13,177,728 profiles, representing the combinations of the parameter-dimensions listed in the table at varying resolutions. The size of the library is calculated by multiplying the resolution steps of each dimension, in the above case, the library size is equal to (16*81*31*4*41*9). The first and last three profiles of a master library compiled with the parameter set of Table 1 would be:

| Grating Top CD | Grating Bottom CD | Grating Thickness | Percent Height at Inflection Point | Grating Width at Inflection Point | Underlying Thickness | Spectrum data |
|---|---|---|---|---|---|---|
| 120 | 160 | 220 | 0.6 | 140 | 2.3 | $Spectra_1$ |
| 120 | 160 | 220 | 0.6 | 140 | 2.5 | $Spectra_2$ |
| 120 | 160 | 220 | 0.6 | 141 | 2.3 | $Spectra_3$ |
| ... | ... | ... | ... | ... | ... | ... |
| 180 | 200 | 250 | 0.9 | 179 | 2.5 | $Spectra_{n1}$ |
| 180 | 200 | 250 | 0.9 | 180 | 2.3 | $Spectra_{n2}$ |
| 180 | 200 | 250 | 0.9 | 180 | 2.5 | $Spectra_{n3}$ |

At about 1.5 seconds per profile, the master library of Table 1 would take a server farm of 128 processors about 7 days of CPU time to generate and compile.

Figure 2B:
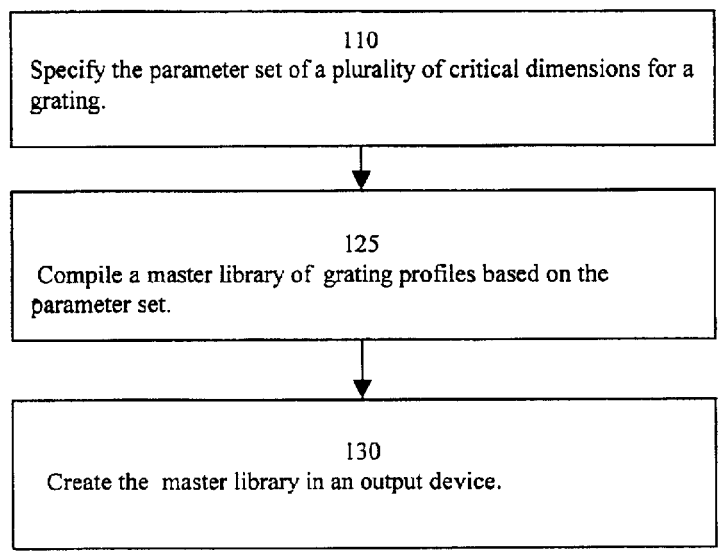
FIG. 2B is a flow chart of the basic steps in compiling a master library of grating profiles in one embodiment of the present invention.

FIG. 2B is a flow chart of the basic steps in compiling a master library of grating profiles in one embodiment of the present invention. Initially, the parameter set of a plurality of dimensions for a grating is specified 110. In one embodiment, the parameter set may be specified by entering the parameters through an input device such as a terminal or PC or it may be specified by identifying a pre-existing file available to the compiler. The pre-existing file may be a file transmitted to the computer or a remote file accessible to the computer. Next, the compiler compiles a master library of grating profiles based on the specified parameter set 125. The specified parameter set is edited to ensure the minimum value, maximum value, and the resolution of the dimension are within the ranges established for the application. For example, in one embodiment, the dimensions must be expressed in nanometers. Next, the master library is stored in a storage medium 130.

Figure 3A:
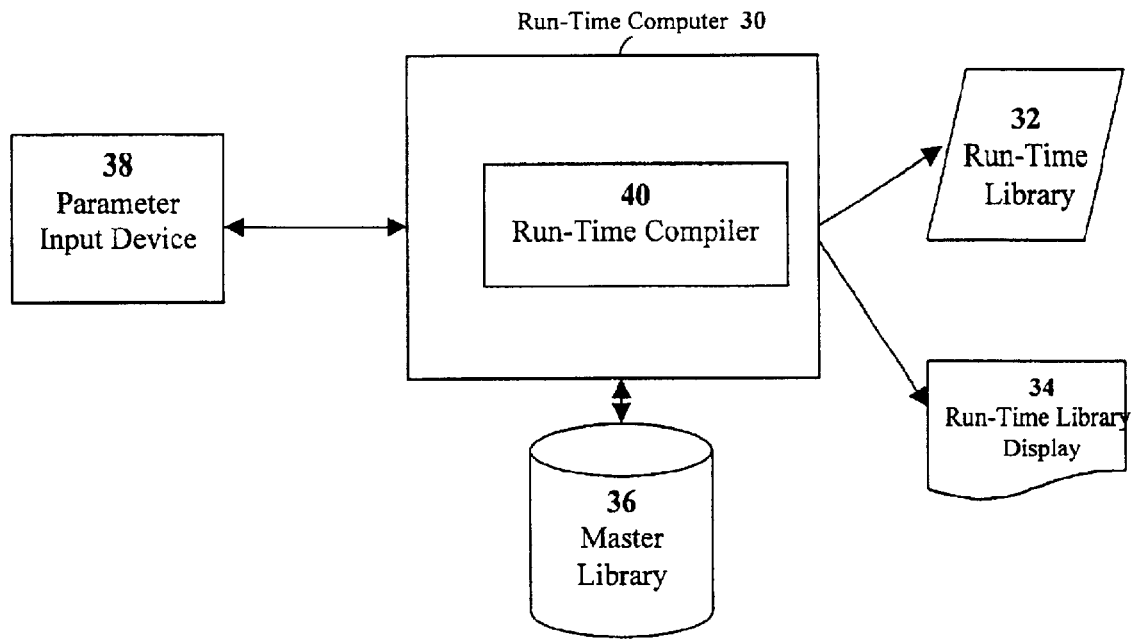
FIG. 3A is an architectural diagram illustrating the compilation of a run-time library of grating profiles in one embodiment of the present invention.

FIG. 3A is an architectural diagram illustrating the compilation of a run-time library of grating profiles in one embodiment of the present invention. The system configuration is similar to FIG. 2A. The parameter input device 38 is used to enter a parameter set for the creation of a run-time library 32 from the master library 36. In alternative embodiments, a parameter set may be created by other input means and specified as the parameter set for a compilation run. The run-time compiler 40, operable in the run-time computer 30, edits the parameter set to ensure application edit rules are followed, and creates the run-time library 32, optionally creating a run-time library display 34. The run-time library 32 may be stored in a storage medium such as a CD-ROM, a DVD, a disk, a tape, or a remote storage. The computer 30 may be co-located with the parameter input device 38 or may reside at a distributed remote site, accessible to the input device 38 through a public network or dedicated communications lines.

Figure 3B:
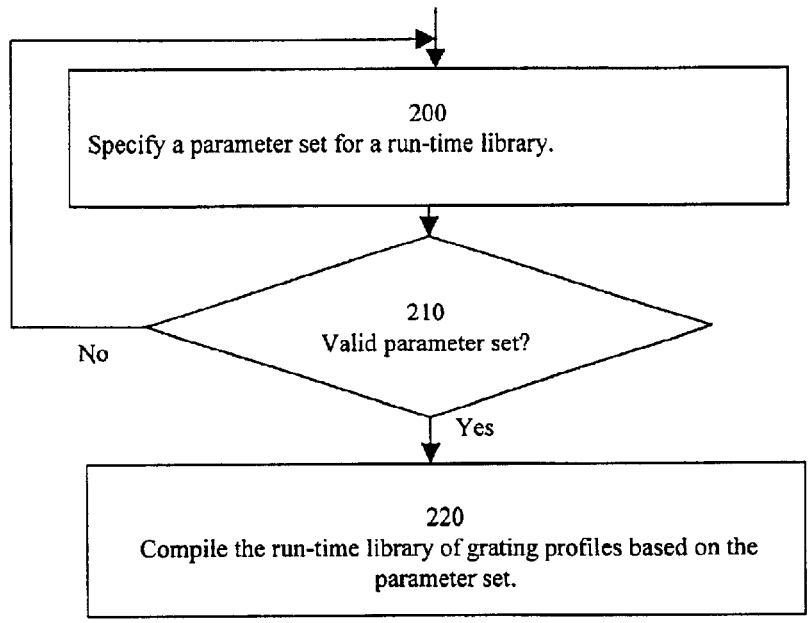
FIG. 3B is a flow chart of the basic steps in compiling a run-time library of grating profiles in one embodiment of the present invention.

FIG. 3B is a flow chart of the basic steps in compiling a run-time library of grating profiles in one embodiment of the present invention. Initially, the parameter set for run-time library is specified 200. Table 2 is an example of a parameter set for compiling a run-time library. In one embodiment, the parameter set may be specified by entering the parameters through an input device such as a terminal or PC or it may be specified by identifying a pre-existing file available to the run-time compiler. The pre-existing file may be a file transmitted to the computer or pre-existing file may be a remote file accessible to the computer. The parameter set is validated 210 by applying the application edits. In one embodiment, the run-time compiler edits the parameter set to ensure that the minimum and maximum values of the dimensions are within the ranges of the same dimension in the master library. The parameter set is also edited to ensure that the resolution is not lower, (i.e., finer resolution) than the resolution used in the master library and that the resolution is a multiple of the resolution used in the master library. Table 3 is an example of a parameter set for compiling a run-time library showing error messages in specifying the resolution. Next, the run-time library is compiled based on the edited parameter set 220.

Figure 4:
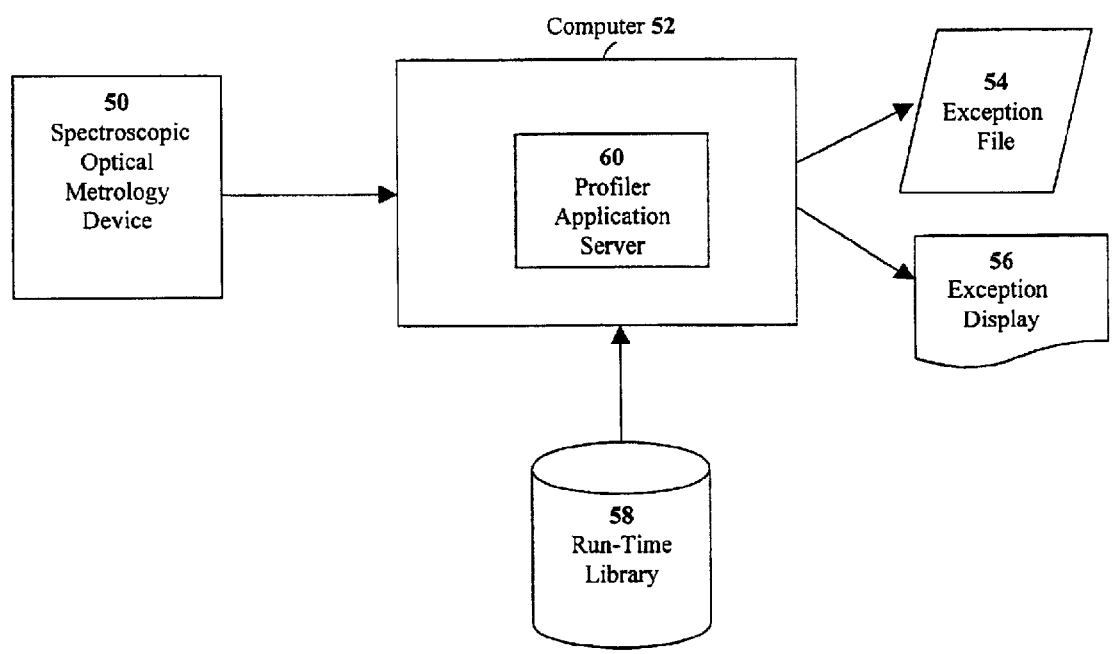
FIG. 4 is an architectural diagram illustrating the use of the run-time library to evaluate grating spectrum data in one embodiment of the present invention.

FIG. 4 is an architectural diagram illustrating one embodiment using the run-time library to evaluate grating spectrum data. A spectroscopic optical metrology device 50 provides grating spectrum data to profiler application server (PAS) 60. The profiler application server 60 accesses the run-time library 58 to compare instances of the library with the spectrum data from the spectroscopic optical metrology device 50. An exception file 54 or an exception display 56 may be created.

Figure 5:
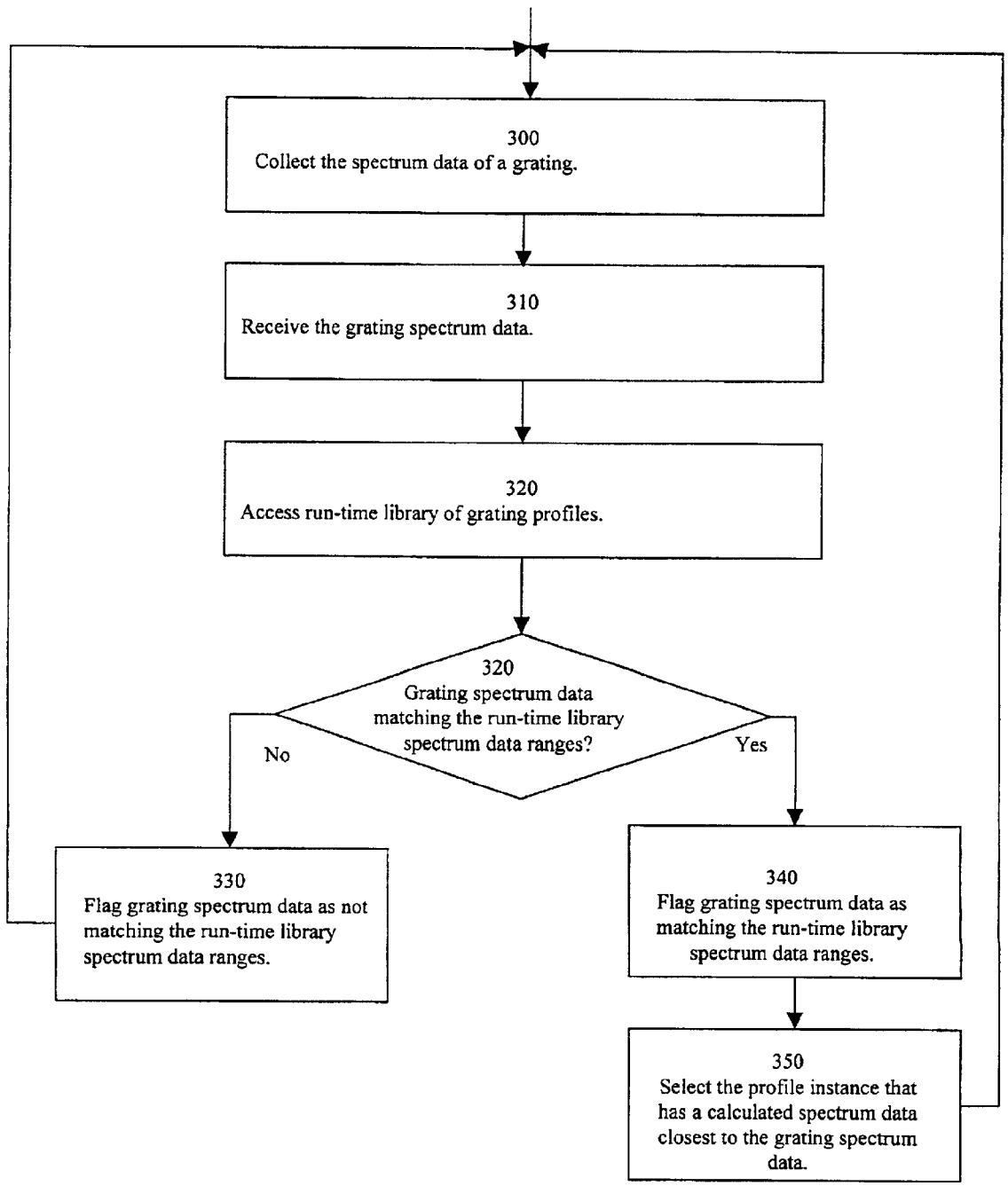
FIG. 5 is a flow chart of the process of using the run-time library to evaluate grating spectrum data in one embodiment of the present invention.

FIG. 5 is a flow chart of the process of using the run-time library to evaluate grating profile data in one embodiment of the present invention. The spectrum data of a grating is collected 300. The collected data may come from spectroscopic optical metrology devices operating real-time or may be from a file containing such data. The spectrum data is received by the profiler application server 310. The profiler application server accesses the run-time library of grating profiles 320 and determines, based on application criteria, if the grating spectrum data is within the run-time library calculated spectrum data ranges 320. If the grating spectrum data is outside the run-time library calculated spectrum data ranges, flag the grating spectrum data 330. Alternatively, if the grating spectrum data is within the run-time library calculated spectrum data ranges, flag the grating spectrum data 340 and select the profile instance that has the calculated spectrum data closest to the grating spectrum data being examined 350. The closest library spectrum data is one that minimizes the error between the grating spectrum data and the library calculated spectrum data. Several optimization procedures are available to minimize the error, such as simulated annealing, described in "Numerical Recipes," section 10.9, Press, Flannery, Teulkolsky & Vetterling, Cambridge University Press, 1986; which is incorporated by reference. The error metric that produces appropriate results is the sum-squared-difference-log error, where the optimization procedure minimizes the error metric between the grating spectrum data and the library spectrum data.

For example, this process would flag a grating with spectrum data outside the run-time library ranges, due to process drift. Conversely, a grating that is within the run-time library ranges may be flagged, depending on the options chosen for the application.

Figure 6:
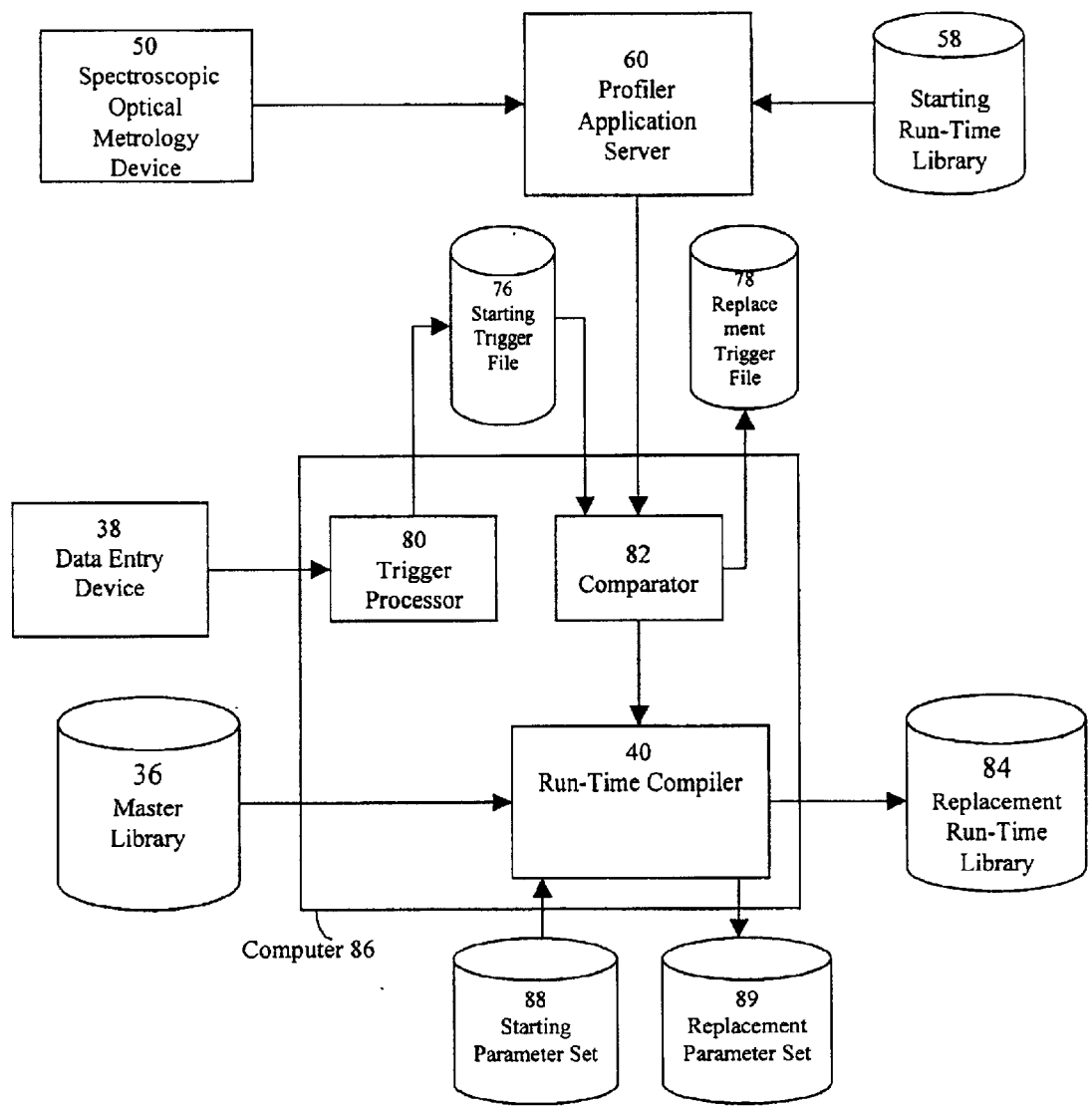
FIG. 6 is an architectural diagram illustrating the automatic compilation of a replacement run-time library in one embodiment of the present invention.

FIG. 6 is an architectural diagram illustrating the automatic compilation of a replacement run-time library in one embodiment of the present invention. A data entry device 38 is used to enter data processed by the trigger processor 80, which creates a starting trigger file 76. For example, a trigger file may contain data indicating a replacement run-time library 84 is required if the process average change of the grating bottom CD is more than 0.5 after a certain number of manufacturing runs, where:

Process average change (D)=(Library Process Average$_{(D)}$-Actual Process Average$_{(D)}$)+(Library Dimension Range$_{(D)}$/2)

where

Library Process Average$_{(D)}$=(Library Maximum Value$_{(D)}$+Library Minimum Value$_{(D)}$)/2;

Actual Process Average$_{(D)}$=(Actual Maximum Value$_{(D)}$+Actual Minimum Value$_{(D)}$)/2;

Library Dimension Range$_{(D)}$=(Library Maximum Value$_{(D)}$-Library Minimum Value$_{(D)}$);

and D is the grating dimension.

A spectroscopic optical metrology device 50 collects grating spectrum data and sends this data to profiler application server 60. The profiler application server 60 selects the profile instance from the starting run-time library 58 that has the calculated spectrum data closest to the grating spectrum data from the spectroscopic optical metrology device 50. Depending on the implementation options, the profiler application server 60 may send the grating dimensions data of the selected profile instance from the starting run-time library 58 immediately to the comparator 82 or accumulate the grating dimensions data and wait until a certain period of time has elapsed or until after a predetermined number of manufacturing cycles is completed or until a trigger condition is encountered. The comparator 82 processes the starting trigger file 76 created by the trigger processor 80 and the real-time or batch data dimensions from the profiler application server 60. If the trigger conditions are met, the comparator 82 invokes run-time compiler 40 to generate a replacement run-time library 84. The comparator 82 also creates a replacement trigger file 78 to be used as the starting trigger file in the next auto compilation cycle. The run-time compiler 40 uses the master library 36 as input, the data from the comparator 82 and the starting parameter set 88 to create the replacement run-time library 84 and to create a replacement parameter set 89. The replacement parameter set 89 becomes the starting parameter set in the next auto compilation cycle. In an alternative embodiment, the profiler application server 60 and the computer 86 may be a single computer device.

Figure 7:
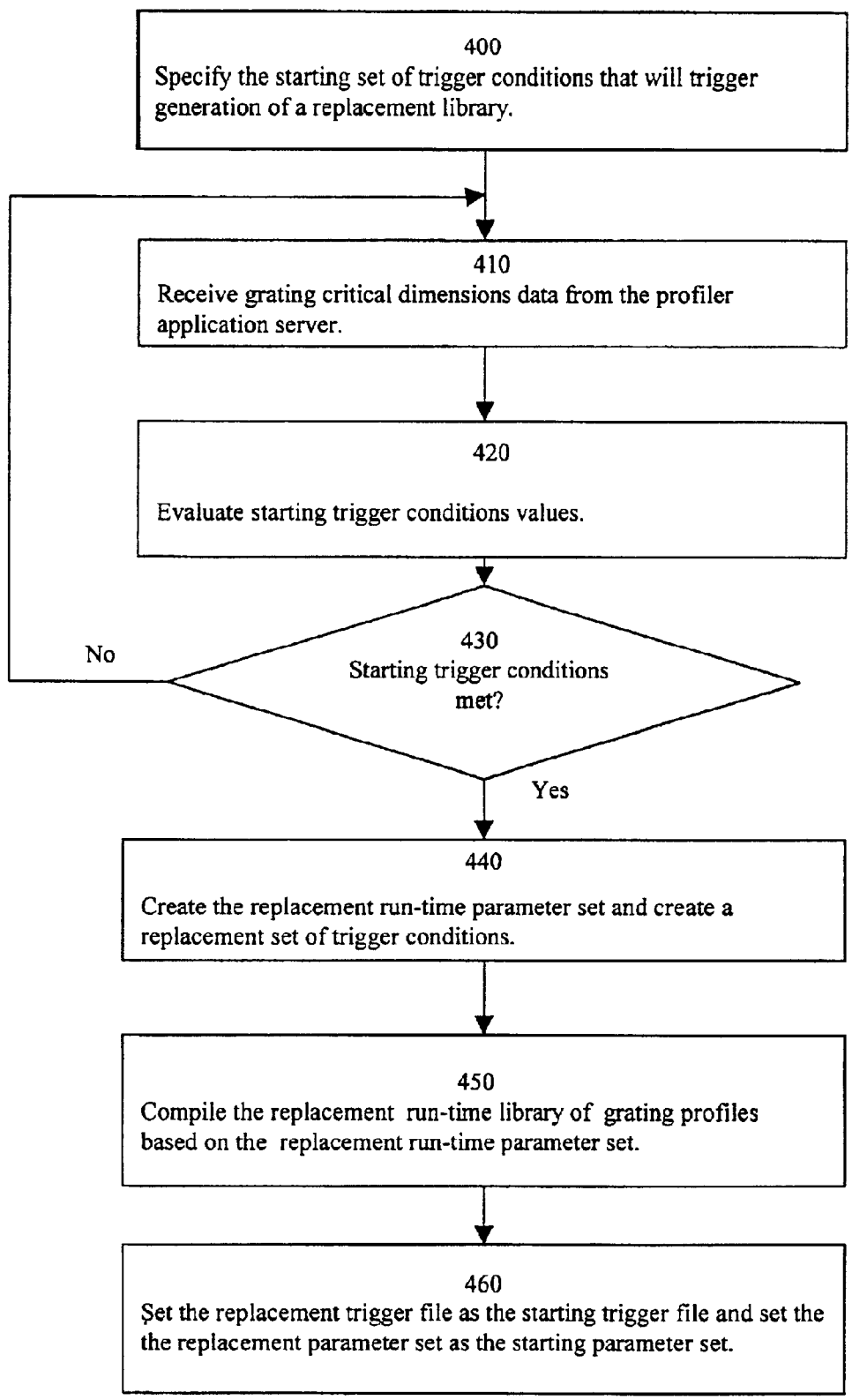
FIG. 7 is a flow chart illustrating the automatic compilation of a replacement run-time library in one embodiment of the present invention.

FIG. 7 is a flow chart illustrating the automatic compilation of a replacement run-time library in one embodiment of the present invention. Based on the application, the client selects one or more trigger conditions that must be met for an auto-compilation to be invoked. This starting set of trigger conditions is specified 400. Grating spectrum data is received and the profile instance from the starting run-time library that has the calculated spectrum data closest to the grating spectrum data is selected 410. The starting trigger condition values are evaluated when the application criteria require the evaluation to be done 420. For example, the application criteria may require evaluation of the trigger condition values after a specific number of manufacturing runs are completed or when a predetermined time interval has elapsed. The starting trigger conditions are compared to the starting trigger condition values and if the conditions are met 430, a replacement trigger file and a replacement run-time parameter set are created 440. The replacement run-time library is compiled based on the replacement run-time parameter set 450. The replacement trigger file is set as the starting trigger file and the replacement parameter is set as the starting parameter set 460.

For example, a run-time library is compiled with the grating bottom CD having a minimum value of 180 nanometers (nm) and a maximum value of 200 nm; thus, the run-time library has a bottom CD process average of 190 nm, (180+200)/2. The starting set of trigger conditions entered for this application is that a replacement run-time library is compiled anytime the change in the grating bottom CD process average exceeds 0.5. After a manufacturing run of 2,000 wafers, the comparator 82 detected that the calculated actual process average for the grating bottom CD changed from 190 nm to 183 nm due to process drift. The grating bottom CD process average changed by 0.7, as shown in the following calculation:

Process average change (Bottom CD)=
[(190−183)÷(200−180)/2]=0.7.

Since the bottom CD process average change of 0.7 is greater than the trigger condition of 0.5, the comparator 82 would invoke the run-time compiler 40 to use the starting parameter set 88, create a replacement parameter set 89 with the grating bottom CD having a minimum value of 173 nm and a maximum value of 193 nm. A replacement run-time library 84 would be compiled by the run-time compiler 40 using the replacement parameter set 89 and the master library 36 as input. The comparator 82 would create a replacement trigger file 78 with a process average of 183 nm. If after another manufacturing run of 1500 wafers, the comparator again detected a shift of the grating bottom CD process average, the process of evaluating the trigger condition values and compilation of the replacement run-time library would be repeated. Table 4 is the example of a replacement parameter set created for the automatic compilation of the run-time library, triggered by the change in the grating bottom CD process average exceeding 0.5.

Figure 8:
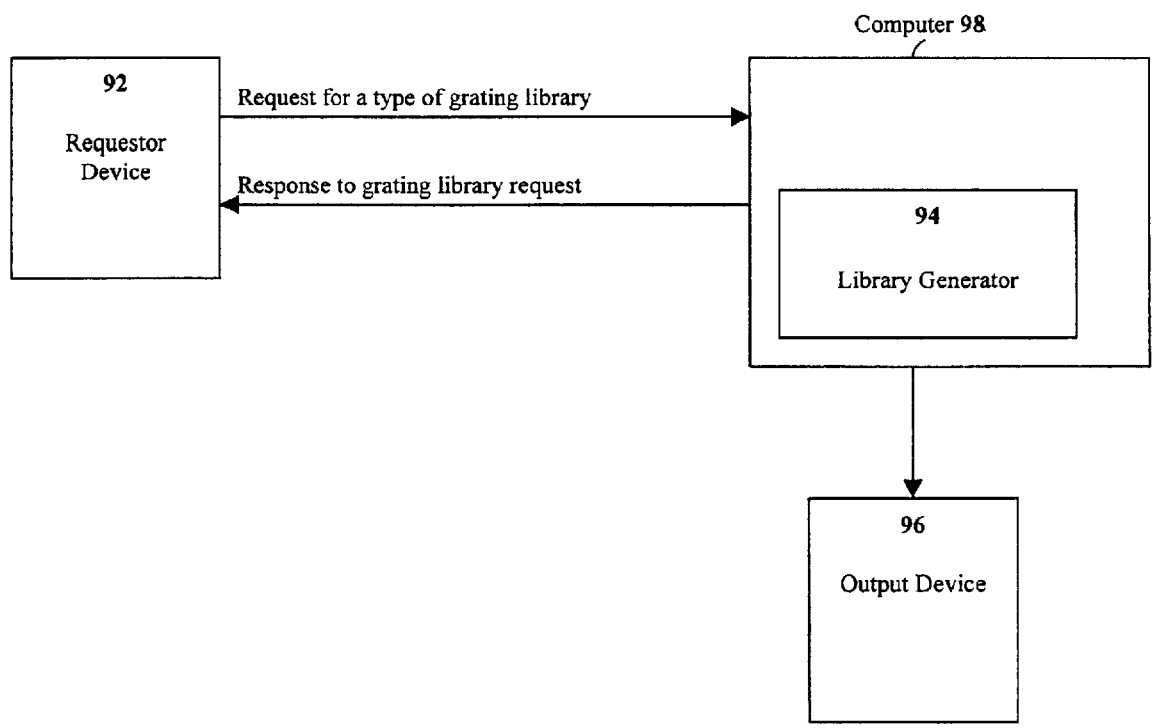
FIG. 8 is an architectural diagram illustrating a grating profile library generator in one embodiment of the present invention.

FIG. 8 is an architectural diagram illustrating a grating profile library generator. A requestor device 92 sends a request for a grating profile library to the library generator 94 operable in computer 98. The library generator 94 creates the library and stores the library in output device 96 and sends a response to requester device 92. The requestor device 92 and the output device 96 may be located in separate remote locations from the computer 98. The links between the requester device 92 and the output device 96 to the computer 98 may be a network, such as the Internet. The computer 98 may be one computer or a server farm. The requester device 92 and the output device 96 may be in the same unit.

Figure 9:
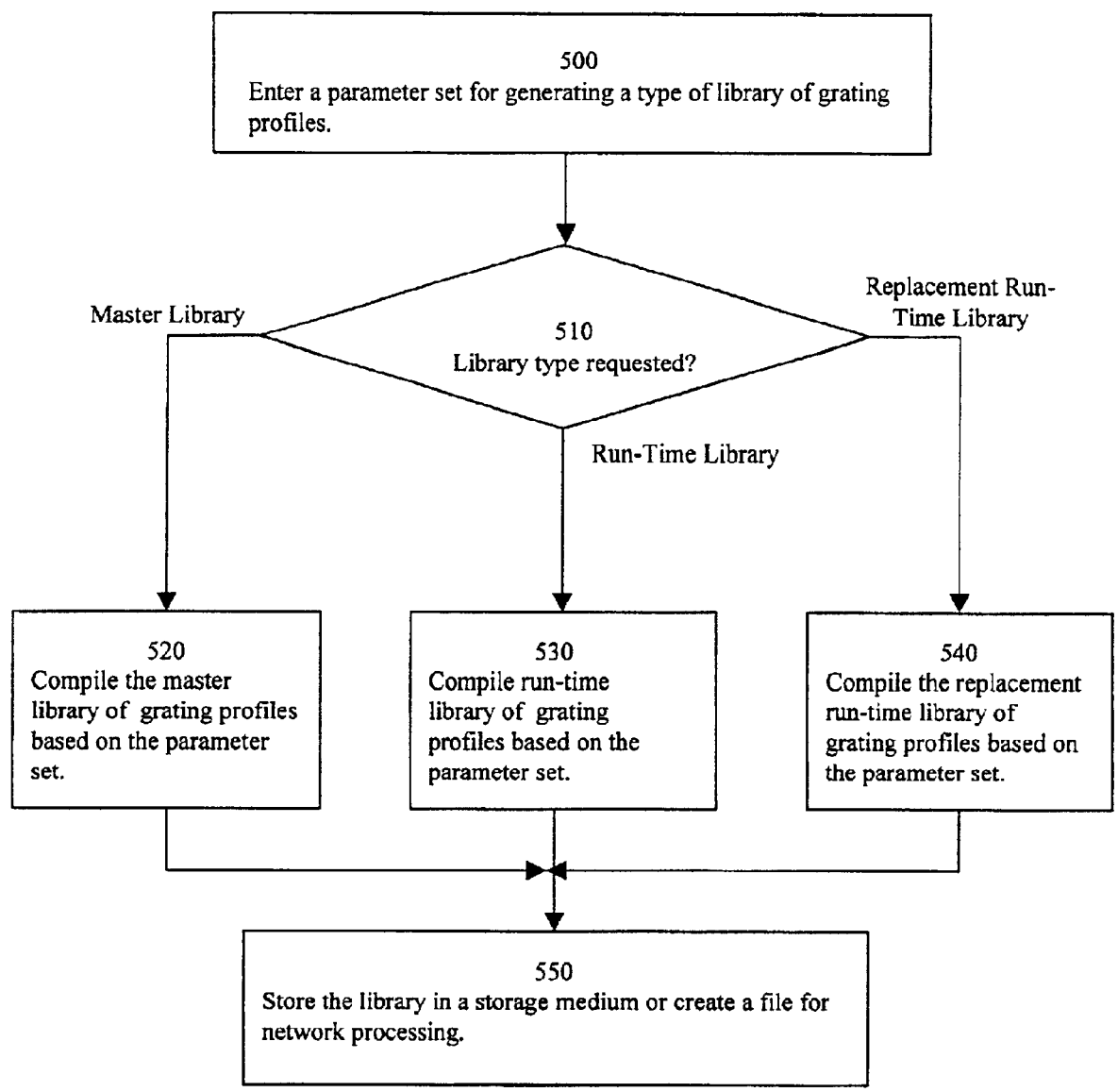
FIG. 9 is a flow chart illustrating the use of a grating profile library generator to generate a master library, a run-time library, and a replacement run-time library, in one embodiment of the present invention.

FIG. 9 is a flow chart illustrating the use of a grating profile library generator to generate a master library, a starting run-time library, and a replacement run-time library, in one embodiment of the present invention. A request for generating a type of grating library is entered 500. The library type entered in the request is determined 510. If the request is for a master library, the master library is compiled 520; if the request is for a run-time library, the run-time library is compiled 530, otherwise if the request is for a replacement run-time library, a replacement run-time library is compiled 540. In all cases where there is a successful compilation, the compiled library is stored in a storage medium or a file is created for network processing 550, where the stored library is transmitted to the client or downloaded by the client.

Figure 10:
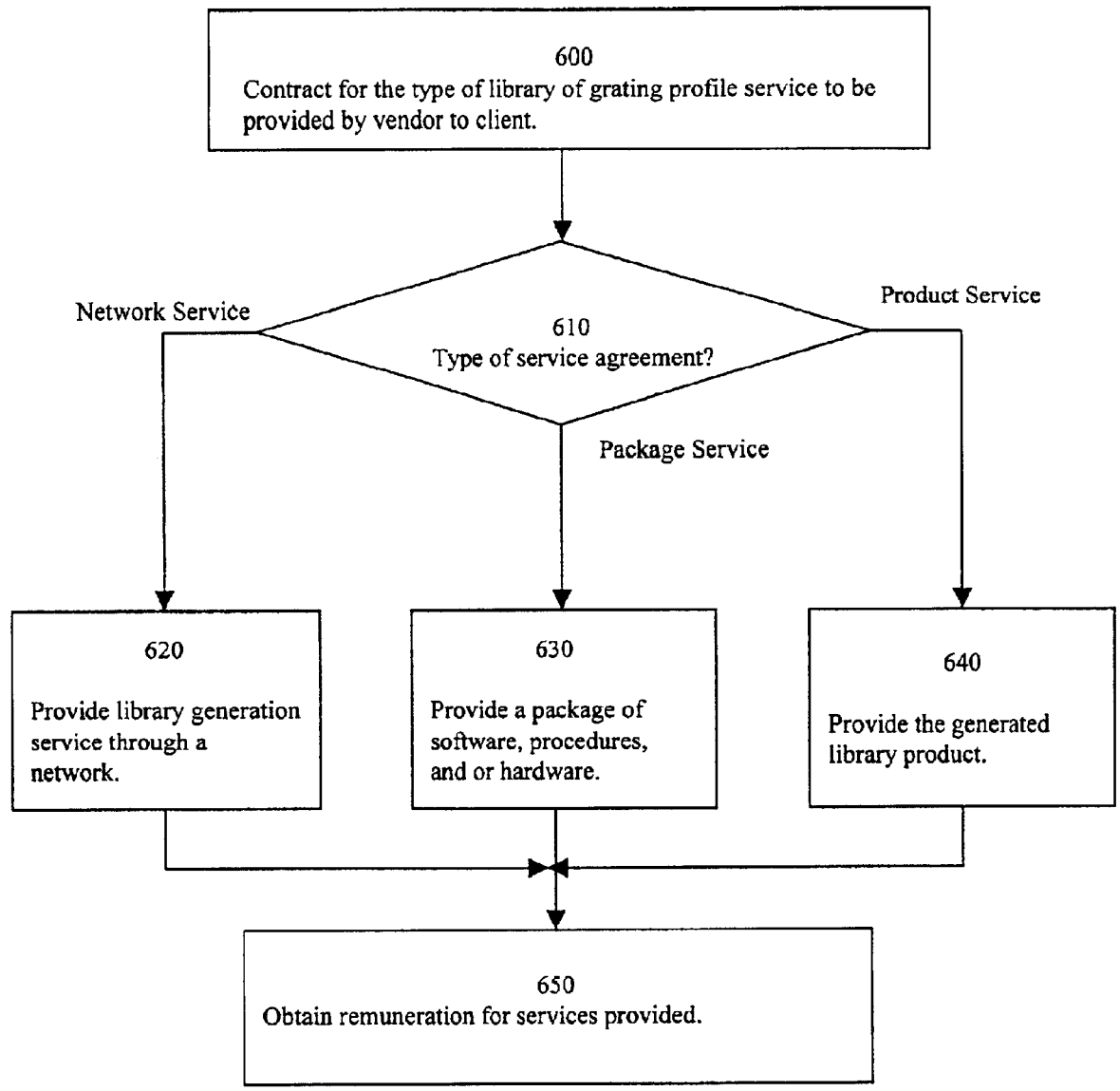
FIG. 10 is a flow chart of the business method of providing a service for generating grating profile libraries in one embodiment of the present invention.

FIG. 10 is a flow chart of the business method of providing a service for generating grating profile libraries in one embodiment of the present invention. The client and the vendor contract for the vendor to provide a service regarding grating profile libraries 600. The type of service contracted may be a network service, package service or product service 610. For a network service, an account is created for the client by the vendor to provide library generation service through a network 620, such as the Internet. For a package service, the vendor provides a package of software, procedures, and or hardware to the client 630. For a product service, the vendor obtains information for the type of library desired and the vendor provides the generated library product 640 to the client. The client may be an organization with many agents, assignees, or licensees. In all instances, the vendor obtains remuneration for the services provided 650.

FIG. 11A shows the database elements of a grating profile library while FIG. 11B shows the display elements of a grating profile library.

There are many advantages for the current invention. The creation of the master library allows a one-time generation of wide ranges, resolutions, and shapes of grating profiles and associated spectrum data, without the need for the laborious empirical measurements. The creation of a run-time library allows for the generation of the specific geometries and shapes of the grating profiles needed for a specific manufacturing window. The size of the run-time library is kept small to facilitate quick search times. Fabricators can re-center their libraries into smaller dimensions or make minor changes to the underlying thickness and get the library response time required for real-time work.

Foregoing described embodiments of the invention are provided as illustrations and descriptions. They are not intended to limit the invention to precise form described. In particular, it is contemplated that functional implementation of invention described herein may be implemented equivalently in hardware, software, firmware, and/or other available functional components or building blocks.

Other variations and embodiments are possible in light of above teachings, and it is thus intended that the scope of invention not be limited by this Detailed Description, but rather by Claims following.

TABLE 1

Parameter Set for Compiling a Master Library

| Parameter | Minimum, nanometer (nm) | Maximum, nanometer (nm) | Resolution, nanometer (nm) |
|---|---|---|---|
| Grating Top Critical Dimension (CD) | 120 | 180 | 1 |
| Grating Bottom CD | 160 | 200 | 0.5 |
| Grating Thickness | 220 | 250 | 1 |
| Percent Height at Inflection Point | 0.6 | 0.9 | 0.1 |
| Grating Width at Inflection Point | 140 | 180 | 1 |
| Underlying Thickness | 2.3 | 2.5 | 0.2 |

TABLE 2

Parameter Set for Compiling a Run-Time Library

| Parameter | Minimum, nm | Maximum, nm | Resolution, nm |
|---|---|---|---|
| Grating Top Critical Dimension (CD) | 140 | 160 | 1 |
| Grating Bottom CD | 180 | 200 | 0.5 |
| Grating Thickness | 230 | 240 | 1 |
| Percent Height at Inflection Point | 0.8 | 0.9 | 0.1 |
| Grating Width at Inflection Point | 150 | 170 | 1 |
| Underlying Thickness | 2.3 | 2.5 | NA |

TABLE 3

Parameter Set for Compiling a Run-Time Library Showing Edit Errors

| Parameter | Minimum, nm | Maximum, nm | Resolution, nm |
|---|---|---|---|
| Grating Top Critical Dimension (CD) | 140 | 160 | 1 |
| Grating Bottom CD | 180 | 200 | 0.25 Resolution too high |
| Grating Thickness | 230 | 240 | 1 |
| Percent Height at Inflection Point | 0.8 | 0.9 | 0.25 Resolution is not a correct multiple |
| Grating Width at Inflection Point | 150 | 170 | 1 |
| Underlying Thickness | 2.3 | 2.5 | NA |

TABLE 4

Replacement Parameter Set for Automatic Compilation of a Run-Time Library Triggered by a Change in the Grating Bottom CD Process Average Exceeding Trigger Conditions

| Parameter | Minimum, nm | Maximum, nm | Resolution, nm |
|---|---|---|---|
| Grating Top Critical Dimension (CD) | 140 | 160 | 1 |
| Grating Bottom CD | 173 | 193 | 0.5 |
| Grating Thickness | 230 | 240 | 1 |
| Percent Height at Inflection Point | 0.8 | 0.9 | 0.1 |
| Grating Width at Inflection Point | 150 | 170 | 1 |
| Underlying Thickness | 2.3 | 2.5 | NA |

What is claimed is:

1. A method of creating a master library of grating profiles, the method comprising:
   specifying a first parameter set including a plurality of dimensions of a grating;
   compiling a master library of profiles using the first parameter set, the profiles including data representing combinations of grating dimensions in the specified first parameter set and corresponding calculated spectrum data;
   specifying a second parameter set; and
   compiling a run-time library of profiles from the master library of profiles using the second parameter set.

2. The master library profile creation method of claim 1, wherein the first parameter set including the plurality of dimensions of the grating comprises a minimum value, a maximum value, and a resolution for a dimension of the plurality of dimensions of the grating.

3. The master library profile creation method of claim 2, wherein the plurality of dimensions of the grating comprises a grating top critical dimension, a grating bottom critical dimension, a grating thickness, and an underlying thickness.

4. The master library profile creation method of claim 3, wherein the plurality of dimensions of the grating further comprises a percent height at inflection point and a grating width at inflection point.

5. The master library profile creation method of claim 1, further comprising storing the master library of grating profiles in a storage medium.

6. The master library profile creation method of claim 5, wherein the storage medium for the master library of grating profiles comprises a CD-ROM, a magnetic tape, a magnetic disk, and a file available for network use.

7. The master library profile creation method of claim 6, wherein the master library of grating profiles available for network use is transmitted to clients or downloaded by clients.

8. The master library profile creation method of claim 1, further comprising:
   validating the second parameter set before compiling the run-time library.

9. The master library profile creation method of claim 8, wherein validating the second parameter set comprises:
   checking that the second parameter set includes maximum and minimum values within maximum and minimum values of the first parameter set; and
   checking that the second parameter set includes a resolution that does not exceed a resolution of the master library.

10. The master library profile creation method of claim 9, where in the resolution of the second parameter set is a multiple of the resolution of the master library.

11. The master library profile creation method of claim 1, further comprising:
   obtaining spectrum data of a grating, wherein the spectrum data was measured using an optical metrology device;
   comparing the obtained spectrum data to calculated spectrum data in the run-time library;
   flagging the obtained spectrum data as falling within or outside calculated spectrum data ranges in the run-time library; and
   selecting a profile instance in the run-time library whose calculated spectrum data is closest to the obtained spectrum data.

12. The master library profile creation method of claim 11, further comprising:
   specifying a trigger condition that causes compilation of a replacement run-time library; and
   compiling the replacement run-time library when the trigger condition is met.

13. The master library profile creation method of claim 12, wherein the trigger condition is evaluated after a specified length of time has elapsed or after a predetermined number of spectrum data have been obtained and compared to calculated spectrum data in the run-time library.

14. A system for creating a master library of grating profiles comprising:
   a storage medium for storing the master library of grating profiles; and
   a computer coupled to the storage medium; and a compiler operable in the computer, for creating the master library of grating profiles;

wherein the computer activates the compiler to create the master library, the compiler prompting specification of a parameter set of grating dimensions, the compiler validating the specified parameter set, the compiler creating the master library of grating profiles, based on the master library of grating profiles in the storage medium.

15. The master library profile creation method of claim 14, wherein the computer is a server farm.

16. The master library profile creation method of claim 14 further comprising an input device, coupled to the computer, for entering the parameter set of grating dimensions for the master library of grating profiles.

17. The master library profile creation method of claim 14, wherein the storage medium for storing the master library of grating profiles comprises a CD-ROM, a magnetic tape, a magnetic disk, and a file available for network use.

18. The master library profile creation method of claim 17, wherein the file available for network use is transmitted to clients or downloaded by clients.

19. The master library profile creation method of claim 18, wherein the file of grating profiles comprises a database of grating profiles and a run-time compiler.

20. A system for creating a master library of grating profiles comprising:

a master library of grating profiles;

a storage medium for storing the run-time library;

a computer coupled to the master library and the storage medium; and a run-time compiler operable in the computer, for generating a run-time library of grating profiles;

wherein the computer activates the run-time compiler to generate the run-time library, the compiler prompting for specification of the selection parameter set, the compiler validating the specified selection parameter set, the compiler extracting the profile from the master library of grating profiles, the compiler creating the run-time library of grating profiles, and the compiler storing the run-time library in the storage medium.

21. The run-time library creation system of claim 20, wherein the specified selection parameter set comprises a specified minimum value, a specified maximum value, and a specified resolution value of the grating dimensions.

22. The run-time library creation system of claim 21, wherein validation of the specified selection parameter set comprises checking that the specified minimum value and specified maximum value of the grating dimension are within the minimum value and maximum value of the corresponding dimension in the master library, and the specified resolution value of the grating dimension is the same or higher than the resolution value of the master library for the corresponding dimension in the master library, and that the specified resolution value for the dimension is a multiple of the resolution value of the master library for the corresponding dimension in the master library.

23. The run-time library creation system of claim 20 further comprising an input device, coupled to the computer, for specifying the selection parameter set for the run-time library.

24. The run-time library creation system of claim 20, wherein the storage medium for storing the run-time of grating profiles comprises a CD-ROM, a magnetic tape, a magnetic disk, and a file available for network use.

25. The run-time library creation system of claim 20, wherein the run-time library comprises a database of grating profiles and a file containing a process average of each dimension of the grating.

26. A method for evaluating grating spectrum data, the method of comprising:

comparing a grating spectrum data to ranges of grating calculated spectrum data in a run-time library;

flagging the grating spectrum data as falling within the calculated spectrum data ranges in the run-time library or flagging the grating spectrum data as falling outside the calculated spectrum data ranges in the run-time library; and selecting the profile instance in the run-time library whose calculated spectrum data is closest to the grating spectrum data.

27. The grating spectrum data evaluation method of claim 26 further comprising recording the selected the instance in the run-time library whose calculated spectrum data is closest to the grating spectrum data.

28. A method of automatically compiling a replacement run-time library of grating profiles, the method comprising:

specifying a set of trigger conditions that causes complications of a replacement run-time library of grating profiles, wherein the set of trigger conditions is evaluated after a specified length of time has elapsed or after a predetermined number or gratings is manufactured; and compiling the new run-time library of grating profiles whenever the set of trigger conditions is met.

29. The automatic compilation of a replacement run-time library method of claim 28, wherein the set of trigger conditions comprises one or more process averages of parameter-dimensions exceeding corresponding predetermined amounts or percentages.

30. A system for automatically compiling a replacement run-time library of grating profiles, the system comprising:

a master library grating profiles;

a starting run-time library of grating profiles compiled with a starting set of trigger conditions causing compilation of a profile library;

a replacement run-time library of grating profiles, for replacing the starting run-time library of grating profiles when compiled;

a run-time compiler for compiling the replacement run-time library of grating profiles;

a computer coupled to the master library and the starting run-time library; and a comparator operable in the computer, for calculating actual process values and comparing the calculated actual process values to the starting set of trigger conditions;

wherein the comparator, detecting a condition where the calculated actual process values meet the requirements of the starting set of trigger conditions, invokes the run-time compiler to compile the replacement run-time library of grating profiles.

31. The automatic run-time library compilation of claim 30, wherein the starting set of trigger conditions is evaluated after a specified length of time has elapsed or after a predetermined number or gratings is manufactured.

32. A system for generating a library of grating profiles comprising:

a parameter set for specifying a type of library of profiles and for specifying ranges and resolutions of dimensions of gratings;

a computer; and a library generator, operable in the computer, for compiling a plurality of profiles, the profiles including data representing combinations of grating dimensions in the specified parameter set and corresponding calculated spectrum data;

wherein the library generator crates a master library of profiles when the type of library specified by the parameter set is for the master library and creates a run-time library of profiles when the type of library specified by the parameter set is for the run-time library.

33. A method of creating a library of profiles of a grating, the method comprising:

obtaining a parameter set including a plurality of dimensions o the grating; and compiling a run-time library of profiles from a master library of profiles using the obtained parameter set.

34. The method of claim 33, further comprising:

verifying the obtained parameter set before compiling the run-time library of profiles.

35. The method of claim 34, wherein verifying the obtained parameter set comprises:

checking that the obtained parameter set includes maximum and minimum values that do not exceed maximum and minimum values of the master library o profiles; and checking that the obtained parameter set includes a resolution that does not exceed a resolution of the master library of profiles.

36. A system of creating a library profiles of a grating, the system comprising:

a storage medium having a master library of profiles stored therein; and a compiler connected to the storage medium that is configured to create a run-time library based on the master library of profiles stored in the storage medium.

37. The system of claim 36, further comprising:

an input device connected to the compiler to receive a parameter set, wherein the compiler creates th run-time library based on the received parameter set.

38. The system of claim 36, further comprising:

an optical metrology device configured to measure spectrum data from the grating, wherein the compiler compares the spectrum data measured by the optical metrology device to calculated spectrum data in the run-time library of profiles to determine a closest matching profile form the run-time library or profiles.

39. A computer storage medium storing the computer readable code for causing a computer system to execute the steps for generating library of grating profiles, the steps comprising:

obtaining a parameter set including a plurality of dimensions of the grating; and compiling a run-time library of profiles from a master library of profiles using the obtained parameter set.

40. A method of evaluating grating spectrum data, the method comprising:

obtaining spectrum data measured from a grating using optical metrology device;

compiling the obtained spectrum data to calculated spectrum data in the run-time library of profiles, wherein the run-time library of profiles was compiled from a master library or profiles; and selecting a profile instance from the run-time library of profiles based on the comparison of the obtained spectrum data to the calculated spectrum data in the run-time library of profiles.

41. The method of claim 40, further comprising:

compiling a replacement run-time library when a trigger condition is met.

* * * * *